(12) United States Patent
Nishida et al.

(10) Patent No.: US 11,209,631 B2
(45) Date of Patent: Dec. 28, 2021

(54) LENS UNIT, IMAGING APPARATUS, AND MOBILE DEVICE

(71) Applicant: Konica Minolta, Inc., Tokyo (JP)

(72) Inventors: Maiko Nishida, Hino (JP); Keiji Matsusaka, Kokubunji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/775,718

(22) PCT Filed: Nov. 9, 2016

(86) PCT No.: PCT/JP2016/083210
§ 371 (c)(1),
(2) Date: May 11, 2018

(87) PCT Pub. No.: WO2017/082287
PCT Pub. Date: May 18, 2017

(65) Prior Publication Data
US 2018/0348488 A1    Dec. 6, 2018

(30) Foreign Application Priority Data

Nov. 12, 2015  (JP) .............................. JP2015-222509

(51) Int. Cl.
| | | |
|---|---|---|
| *G02B 13/02* | (2006.01) | |
| *G02B 3/04* | (2006.01) | |
| *G02B 13/14* | (2006.01) | |
| *G02B 13/00* | (2006.01) | |
| *G02B 13/18* | (2006.01) | |
| *G02B 9/12* | (2006.01) | |

(52) U.S. Cl.
CPC .............. *G02B 13/02* (2013.01); *G02B 3/04* (2013.01); *G02B 9/12* (2013.01); *G02B 13/0035* (2013.01); *G02B 13/14* (2013.01); *G02B 13/18* (2013.01)

(58) Field of Classification Search
CPC ....... G02B 9/12; G02B 13/0035; G02B 13/18
USPC .......................................................... 359/716
See application file for complete search history.

(56) References Cited

U.S. PATENT DOCUMENTS 7,095,901 B2 *  8/2006  Lee ..................... G06K 9/00604
                                                      348/78
7,224,540 B2 *  5/2007  Olmstead ........... G02B 27/0075
                                                      235/462.41

(Continued)

FOREIGN PATENT DOCUMENTS

CN       104090347 A    10/2014
WO    2011/092983 A1    8/2011

OTHER PUBLICATIONS

Written Opinion issued in corresponding International Application No. PCT/JP2016/083210 dated Jan. 24, 2017 (7 pages).

(Continued)

*Primary Examiner* — Nicholas R. Pasko
(74) *Attorney, Agent, or Firm* — Osha Bergman Watanabe & Burton LLP

(57) ABSTRACT

A lens unit includes: an imaging optical system; and a lens barrel holding the imaging optical system. The imaging optical system includes, in order from an object side: a first lens having a positive refractive power; a second lens including at least one surface having an aspherical shape; and a third lens having a negative refractive power, at least one surface having an aspherical shape, and an inflection point other than an intersection with an optical axis.

7 Claims, 14 Drawing Sheets

(56) References Cited

U.S. PATENT DOCUMENTS

| | | | | |
|---|---|---|---|---|
| 7,271,839 B2* | 9/2007 | Lee | ........................ | G07C 9/37 348/346 |
| 7,486,327 B2* | 2/2009 | Isono | ...................... | G02B 9/12 348/335 |
| 7,511,899 B2* | 3/2009 | Isono | ...................... | G02B 9/12 359/716 |
| 7,572,008 B2* | 8/2009 | Elvesjo | ................. | A61B 3/113 351/206 |
| 7,646,553 B2* | 1/2010 | Isono | ................ | G02B 13/0035 359/791 |
| 8,077,400 B2* | 12/2011 | Tang | ..................... | G02B 13/18 359/716 |
| 8,500,278 B2* | 8/2013 | Lo | ........................ | A61B 3/113 351/206 |
| 8,558,939 B2* | 10/2013 | Matsui | .............. | G02B 13/0035 348/340 |
| 8,773,774 B2* | 7/2014 | Tsai | ................... | G02B 13/0035 359/716 |
| 2009/0016574 A1* | 1/2009 | Tsukahara | .......... | G06K 9/00906 382/117 |
| 2014/0063623 A1* | 3/2014 | Ishizaka | .................. | G02B 3/04 359/716 |
| 2014/0184877 A1* | 7/2014 | Ahn | ........................ | G02B 9/02 348/340 |
| 2015/0227790 A1* | 8/2015 | Smits | ................. | G06K 9/00604 348/78 |
| 2015/0370039 A1* | 12/2015 | Bone | ................. | G02B 13/0035 359/715 |
| 2016/0282584 A1* | 9/2016 | Cui | .......................... | G02B 9/14 |

OTHER PUBLICATIONS

International Search Report issued in corresponding International Application No. PCT/JP2016/083210 dated Jan. 24, 2017 (5 pages).
Office Action issued in corresponding Japanese Patent Application No. 2017-550352, dated Sep. 17, 2019, with translation (8 pages).

* cited by examiner

SPHERICAL ABERRATION (mm)

ASTIGMATISM (mm)

DISTORTION (%)

MERIDIONAL COMA ABERRATION

F = 2.1
— s-RAY
SPHERICAL ABERRATION (mm)

Y = 1.80
— S
----- M
ASTIGMATISM (mm)

Y = 1.80
DISTORTION (%)

Y = 1.80
— s-RAY

Y = 0.90
— s-RAY
MERIDIONAL COMA ABERRATION

F = 2.2
— s-RAY
SPHERICAL ABERRATION (mm)

Y = 1.60
— S
----- M
ASTIGMATISM (mm)

Y = 1.60
DISTORTION (%)

Y = 1.60
0.005
—0.005
— s-RAY

Y = 0.80
0.005
—0.005
— s-RAY

MERIDIONAL COMA ABERRATION

SPHERICAL ABERRATION (mm)

ASTIGMATISM (mm)

DISTORTION (%)

MERIDIONAL COMA ABERRATION

SPHERICAL ABERRATION (mm)

ASTIGMATISM (mm)

DISTORTION (%)

MERIDIONAL COMA ABERRATION

SPHERICAL ABERRATION (mm)

ASTIGMATISM (mm)

DISTORTION (%)

MERIDIONAL COMA ABERRATION

LENS UNIT, IMAGING APPARATUS, AND MOBILE DEVICE

TECHNICAL FIELD

The present invention relates to a non-wide angle type lens unit that is small in size and has reduced aberration, and an imaging apparatus and a mobile device incorporating the lens unit, and in particular relates to a lens unit or the like suitable for iris authentication that enables authentication by forming an image of an iris, and other applications.

BACKGROUND

For example, as an imaging optical system for iris authentication, one is known that includes, in order from the object side, a positive first lens, a negative second lens, and a negative third lens (Patent Literature 1). Here, the first lens is a meniscus lens convex on the object side, the second lens is an arcuate lens, and the third lens is also an arcuate lens.

In addition, as an imaging optical system not limited to the iris authentication, one is known that includes, in order from the object side, a positive first lens, a second lens that is positive in the paraxial portion and negative in the peripheral portion, and a negative third lens (Patent Literature 2). Here, the first lens is a meniscus lens convex on the object side, the second lens is a lens that is positive in the paraxial portion and negative in the peripheral portion, and the third lens is a lens convex on the object side in the paraxial portion.

However, in the imaging optical system of Patent Literature 1, the negative power of the second lens is large and aberration correction is insufficient.

In addition, in the imaging optical system of Patent Literature 2, the interval between the first lens and the second lens is narrow and aberration correction is insufficient. In particular, in the case of the imaging optical system for iris authentication, it is required that the focal length is long, the spherical aberration and the field curvature are satisfactorily corrected, and high performance is obtained at high frequencies; however, the imaging optical systems in Patent Literature 1 and Patent Literature 2 are not sufficiently suitable for iris authentication due to the reasons as described above, and the like.

PATENT LITERATURE

Patent Literature 1: CN 104090347 A
Patent Literature 2: WO 2011/092983 A

SUMMARY

One or more embodiments provide a lens unit, an imaging apparatus, and a mobile device capable of enabling authentication and the like with improved reliability by suppressing aberration while being small in size.

One or more embodiments are directed to a lens unit including an imaging optical system and a lens barrel holding the imaging optical system, in which the imaging optical system includes, in order from an object side, a first lens having positive refractive power, a second lens including at least one surface having an aspherical shape, and a third lens having negative refractive power, the third lens including at least one surface having an aspherical shape, the third lens having an inflection point other than an intersection with an optical axis, and the imaging optical system satisfies following conditional expressions.

$$f/TL > 0.92 \quad (1)$$

$$0.10 > f/f2 > -0.17 \quad (2)$$

$$0.60 > d2/f > 0.22 \quad (3)$$

where
  f: a focal length of the entire imaging optical system,
  TL: a distance on the optical axis to an image side focal point from a lens surface closest to the object side of the imaging optical system,
  d2: an axial air space between the first lens and the second lens, and
  f2: a focal length of the second lens.

According to one or more embodiments, the lens unit has a so-called telephoto type configuration in which the positive first lens is arranged on the object side and the negative third lens is arranged on the image side. This lens configuration is an advantageous configuration for downsizing the entire length of the imaging optical system. In addition, among the three lenses, at least one surface of the third lens arranged closest to the image side is made aspherical, whereby various aberrations in the periphery of the screen can be satisfactorily corrected. Further, this aspherical surface is formed into an aspherical shape having the inflection point at a position other than the intersection, whereby a telecentric characteristic of image side light flux can be easily secured. Here, the "inflection point" is a point on the aspherical surface where the positive or negative of the sign of the second-order differential value of the aspherical shape is reversed in the curve of the lens sectional shape within the effective radius. Note that, in a case where a parallel flat plate such as an optical low-pass filter, a band pass filter, or a seal glass of a solid-state imaging device package is arranged between the image side focal point position and a surface closest to the image side of the imaging optical system, the value of TL is calculated assuming that a portion of the parallel flat plate is an equivalent air distance.

According to one or more embodiments, the conditional expression (1) is for appropriately setting the focal length and the entire length of the imaging optical system. The lower limit of the conditional expression (1) is exceeded, whereby a small size lens is obtained that can be mounted on a mobile device while an appropriate focal length is secured for imaging an object whose angle of view is small. Further, the value f/TL desirably satisfies the following conditional expression.

$$f/TL > 0.95 \quad (1)'$$

According to one or more embodiments, the conditional expressions (2) and (3) are for satisfactorily correcting the various aberrations while the imaging optical system has a long focal length and small size. The conditional expression (2) is satisfied, whereby the second lens has refractive power that is neither strongly positive nor strongly negative, and further, at least one surface of the second lens is made aspherical, whereby the various aberrations can be corrected while the characteristic of the telephoto type is not weakened. In addition, the lower limit of the conditional expression (3) is exceeded, whereby the position of the second lens including at least one surface being aspherical can be appropriately brought closer to the image side, and the various aberrations in the periphery of the screen can be satisfactorily corrected. Meanwhile, the upper limit of the conditional expression (3) does not fall below, whereby the second lens does not come too close to the image side, the third lens can be arranged at an appropriate position, and the telecentric characteristic can be secured. Further, the values f/f2 and d2/f desirably satisfy the following conditional expressions.

$$0.08 > f/f2 > -0.15 \quad (2)'$$

$$0.50 > d2/f > 0.25 \quad (3)'$$

According to one or more embodiments, an imaging apparatus includes: the above-described lens unit; an image detection unit that detects an image formed by the lens unit; and a processing unit that processes a signal from the image detection unit.

According to one or more embodiments, a mobile device includes the above-described imaging apparatus, and causes the imaging apparatus to perform imaging.

The mobile device includes the imaging apparatus according to one or more embodiments of the present invention, and enables highly accurate imaging of an object whose angle of view is small. The imaging optical system incorporated in the mobile device may have an entire length of 6 mm or less; however, the conditional expressions (1) to (3) are satisfied, whereby an imaging optical system can be obtained that is compatible with a case where the entire length is 6 mm or less while the various aberrations are satisfactorily corrected. In particular, the mobile device can image an iris image, and the device has an iris authentication function, whereby security and reliability can be enhanced.

DETAILED DESCRIPTION

Figure 1:
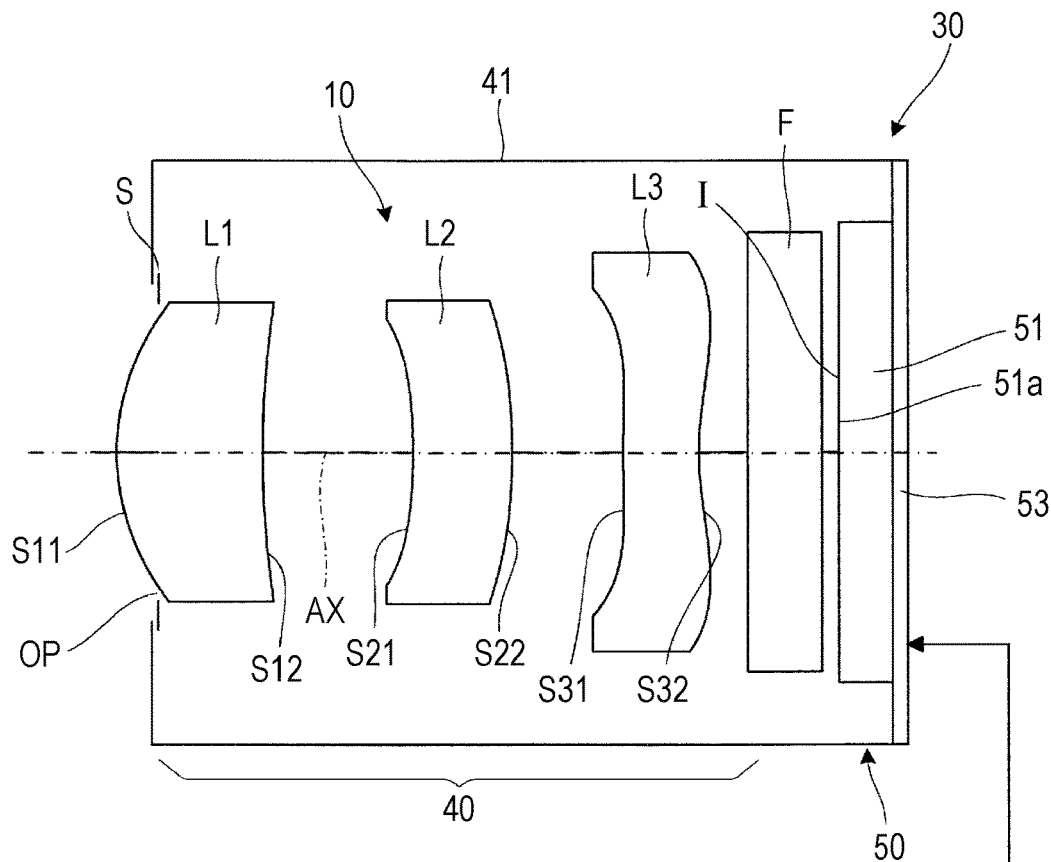
FIG. 1 is a diagram illustrating a lens unit and an imaging apparatus incorporating the lens unit, in accordance with one or more embodiments of the present invention.
Figure 1:
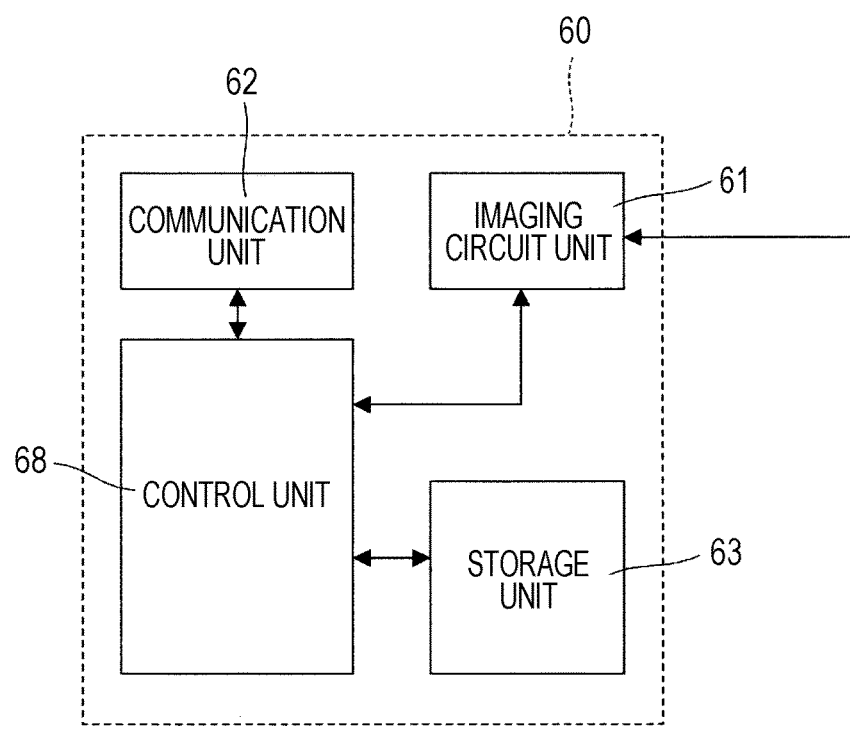

FIG. 1 is a diagram illustrating a lens unit and an imaging apparatus incorporating the lens unit according to one or more embodiments of the present invention.

An imaging apparatus 100 includes a camera module 30 for forming an image signal and a processing unit 60 for causing the camera module 30 to operate to exert a function as the imaging apparatus 100.

The camera module 30 includes a lens unit 40 including an imaging optical system 10 for iris authentication and a lens barrel 41 holding the imaging optical system 10, and a sensor unit 50 that is an image detection unit converting a subject image formed by the imaging optical system 10 into an image signal. The lens unit 40 for iris authentication includes the standard or telephoto type imaging optical system 10 having reduced aberration but can be made small in size, and is suitable for iris imaging for iris authentication.

In the lens unit 40, the imaging optical system 10 is a standard or telephoto type imaging lens having an angle of view of 45° or less, and as will be described in detail later, the imaging optical system 10 includes, in order from the object side, an aperture stop S, a first lens L1, a second lens L2, and a third lens L3, and one or more parallel flat plates F can be arranged on the image side of the third lens L3. The parallel flat plate F can have a filter function related to a wavelength and others. The lens barrel 41 is made of plastic or the like, and accommodates and holds the first to third lenses L1 to L3 and the like inside the lens barrel 41. The lens barrel 41 includes an opening OP through which a bundle of rays from the object side enters.

The sensor unit (image detection unit) 50 includes a solid-state imaging device 51 (for example, a CMOS image sensor) that photoelectrically converts the subject image formed by the imaging optical system 10, and a circuit board 53 that supports the solid-state imaging device 51 from behind and provided with wiring, an accompanying circuit, and the like. The sensor unit 50 is fixed to the lens unit 40 via the lens barrel 41.

The solid-state imaging device (imaging device) 51 includes a photoelectric conversion unit 51a as an imaging surface I, and a signal processing circuit (not illustrated) is formed around the solid-state imaging device (imaging device) 51. In the photoelectric conversion unit 51a, pixels, that is, photoelectric conversion devices are two-dimensionally arranged. Note that, the solid-state imaging device 51 is not limited to the CMOS image sensor, but may be another one such as a CCD.

The processing unit 60 includes an imaging circuit unit 61, a communication unit 62, a storage unit 63, and a control unit 68, and processes a signal from the sensor unit (image detection unit) 50. The imaging circuit unit 61 operates the solid-state imaging device 51 by receiving supply of a clock signal or a voltage for electrically driving the solid-state imaging device 51 from the control unit 68. The communication unit 62 is connected to an external device to enable output of image data and exchange of control signals. The storage unit 63 stores information necessary for operation of the imaging apparatus 100, image data acquired by the camera module 30, and the like. The control unit 68 comprehensively controls operations of the imaging circuit unit 61, the communication unit 62, and the storage unit 63, and can perform various types of image processing on the image data obtained by the camera module 30, for example.

Note that, although a detailed description will be omitted, the imaging apparatus 100 or the camera module 30 is incorporated in a mobile device as a part of an iris authentication apparatus. Here, the mobile device means various portable electronic devices including a notebook PC, a smartphone or another mobile terminal, a wearable PC, a camera, a PDA, and the like. The imaging apparatus 100 or the camera module 30 can also be used as a part of an in-vehicle camera or an iris authentication apparatus using the in-vehicle camera. The specific function of the processing unit 60 is appropriately adjusted in accordance with the function and operation of the iris authentication apparatus or the mobile device into which the imaging apparatus 100 is incorporated.

Figure 2:
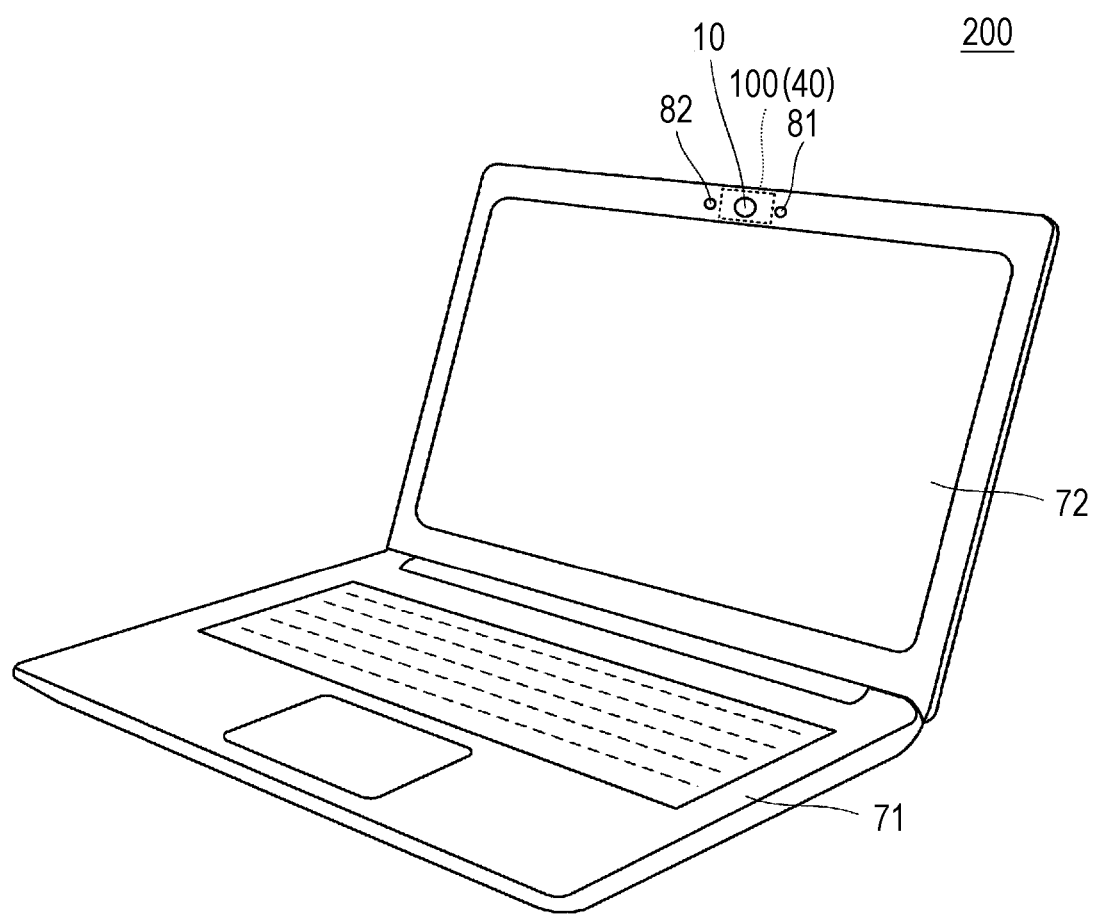
FIG. 2 is a perspective view illustrating a mobile device including the imaging apparatus of FIG. 1.

FIG. 2 is a perspective view illustrating an example of a mobile device incorporating the imaging apparatus 100 or the camera module 30 illustrated in FIG. 1. A mobile device 200 illustrated is a notebook PC including a main body 71 and a display 72, includes a pair of light sources 81 and 82, and the imaging apparatus 100, as an iris authentication apparatus on the upper part of the display 72, and causes the imaging apparatus 100 to perform imaging operation by a control part (not illustrated). The pair of light sources 81 and 82 emit near infrared illumination light having a wavelength of 750 nm to 900 nm toward a user of the notebook PC. The imaging apparatus 100 images the face of the user of the notebook PC, in particular, the periphery of the eye.

Hereinafter, with reference to FIG. 1, the imaging optical system 10 in accordance with one or more embodiments will be described. Note that, the imaging optical system 10 illustrated in FIG. 1 has the same configuration as an imaging optical system 11 of Example 1 described later.

The imaging optical system 10 illustrated includes, in order from the object side, the first lens L1 having positive refractive power, the second lens L2 having negative, positive, or zero refractive power, and the third lens L3 having negative refractive power. In the first lens L1, one surface or both surfaces of an entrance surface S11 and an exit surface S12 can be made aspherical. In the second lens L2, at least one surface of an entrance surface S21 and an exit surface S22 is aspherical, and both optical surfaces (lens surfaces) can be made aspherical. In the third lens L3, at least one surface of an entrance surface S31 and an exit surface S32 is aspherical, and both optical surfaces can be made aspherical. Further, the third lens L3 has an inflection point other than an intersection with an optical axis AX.

The imaging optical system 10 has a so-called telephoto type configuration in which the positive first lens L1 is arranged on the object side and the negative third lens L3 is arranged on the image side. This lens configuration is an advantageous configuration for downsizing the entire length of the imaging optical system 10. In addition, at least one surface of the pair of optical surfaces (the entrance surface S21 and the exit surface S22) configuring the second lens L2 having a weak power is made aspherical, whereby a satisfactory correction of the aberration is possible coupled with an arrangement and the like described later. Further, at least one surface of the pair of optical surfaces (the entrance surface S31 and the exit surface S32) configuring the third lens L3 arranged closest to the image side is made aspherical, whereby various aberrations in the periphery of the screen can be satisfactorily corrected. Further, this optical surface is formed into an aspherical shape having the inflection point at a position other than the intersection with the optical axis AX, whereby a telecentric characteristic of image side light flux can be easily secured.

The first to third lenses L1 to L3 are formed of plastic or glass having optical transparency in the near infrared wavelength range. This is because for imaging an iris and other special objects, near infrared light is often used to improve detection accuracy. In addition, the first lens L1 may be formed of a glass material. In the glass material, refractive index change and expansion and contraction due to the temperature are small, and the first lens L1 is made of glass, whereby performance change can be suppressed small with respect to environmental change.

The imaging optical system 10 satisfies the following conditional expressions (1) to (3).

$$f/TL > 0.92 \quad (1)$$

$$0.10 > f/f2 > -0.17 \quad (2)$$

$$0.60 > d2/f > 0.22 \quad (3)$$

where the value f is a focal length of the entire imaging optical system 10, the value TL is a distance on the optical axis AX to an image side focal point from the entrance surface S11 of the first lens L1 closest to the object side of the imaging optical system 10, the value d2 is an axial air space between the first lens L1 and the second lens L2, and the value f2 is a focal length of the second lens L2.

The conditional expression (1) is for appropriately setting the focal length and the entire length of the imaging optical system 10. The value f/TL exceeds the lower limit of the conditional expression (1), whereby a small size lens is obtained that can be mounted on the mobile device 200 while an appropriate focal length is secured for imaging an object whose angle of view is small. Further, the value f/TL desirably satisfies the following conditional expression.

$$f/TL > 0.95 \quad (1)'$$

The conditional expressions (2) and (3) are for satisfactorily correcting the various aberrations while the imaging optical system has a long focal length and small size. The value f/f2 satisfies the conditional expression (2), whereby the second lens L2 has refractive power that is neither strongly positive nor strongly negative, and further, at least one surface of the optical surfaces (lens surfaces) S21 and S22 of the second lens L2 is made aspherical, whereby the various aberrations can be corrected while the characteristic of the telephoto type is not weakened. In addition, the value d2/f exceeds the lower limit of the conditional expression (3), whereby the position of the second lens L2 including at least one surface being aspherical can be appropriately brought closer to the image side, and the various aberrations in the periphery of the screen can be satisfactorily corrected. Meanwhile, the value d2/f falls below the upper limit of the conditional expression (3), whereby the second lens L2 does not come too close to the image side, the third lens L3 can be arranged at an appropriate position, and the telecentric characteristic can be secured. Further, the values f/f2 and d2/f desirably satisfy the following conditional expressions.

$$0.08 > f/f2 > -0.15 \quad (2)'$$

$$0.50 > d2/f > 0.25 \quad (3)'$$

The imaging optical system 10 desirably satisfies the following conditional expression (4) in addition to the conditional expressions (1) to (3).

$$1.1 > f1/f > 0.7 \quad (4)$$

where the value f1 is a focal length of the first lens L1, and the value f is the focal length of the entire imaging optical system 10.

The conditional expression (4) is for appropriately setting the focal length of the first lens L1. The value f1/f falls below the upper limit of the conditional expression (4), whereby the refractive power of the first lens L1 can be appropriately maintained, so that a principal point position of the entire system can be arranged closer to the object side, and the entire length of the imaging optical system 10 can be shortened. Meanwhile, the value f1/f exceeds the lower limit of the conditional expression (4), whereby the focal length of the first lens L1 does not become excessively shorter than necessary, and a high-order spherical aberration and coma aberration generated in the first lens L1 can be suppressed small. Further, the value f1/f desirably satisfies the following conditional expression.

$$1.0 > f1/f > 0.8 \quad (4)'$$

The imaging optical system 10 desirably satisfies the following conditional expression (5) in addition to the conditional expressions (1) to (3) and the like.

$$-0.8 > f3/f > -1.2 \quad (5)$$

where the value f3 is a focal length of the third lens L3, and the value f is the focal length of the entire imaging optical system 10.

The conditional expression (5) is a conditional expression for appropriately setting the focal length of the third lens L3. The value f3/f falls below the upper limit of the conditional expression (5), whereby a negative focal length of the third lens L3 does not become excessively shorter than necessary, the bundle of rays forming an image on the periphery of the screen of the solid-state imaging device 51 is not excessively flipped up, and telecentricity of the image side light flux can be easily secured. Meanwhile, the value f3/f exceeds the lower limit of the conditional expression (5), whereby the negative focal length of the third lens L3 can be appropriately lengthened, the entire length of the imaging optical system 10 can be shortened, and field curvature and aberrations such as distortion can be satisfactorily corrected. Further, the value f3/f desirably satisfies the following conditional expression.

$$-0.85 > f3/f > -1.15 \quad (5)'$$

The imaging optical system 10 desirably satisfies the following conditional expression (6) in addition to the conditional expressions (1) to (3) and the like.

$$45° > 2w \quad (6)$$

where
the value w is a half angle of view.

The conditional expression (6) is a conditional expression for appropriately setting an angle of view of the imaging optical system 10. The angle of view is set to the range of the conditional expression (6), whereby an image can be obtained suitable for imaging an object (for example, a pupil or an iris) whose angle of view is small. Further, the value 2w desirably satisfies the following conditional expression.

$$40° > 2w \quad (6)'$$

Note that, the imaging optical system 10 may further include other optical devices (for example, lenses, filter members, and the like) that have substantially no refractive power (or power).

EXAMPLES

Hereinafter, examples will be described of the imaging optical system or the lens unit in accordance with one or more embodiments of the present invention. Symbols used in each example are as follows.
R: radius of paraxial curvature
D: axial surface distance
Ns: refractive index of lens material with respect to s-ray
ER: effective radius
In each example, a surface on which "*" is written after each surface number (Surf-N) is a surface having an aspherical shape, and when the vertex of the surface is the origin, the X axis is taken in the optical axis direction, and the height in the direction perpendicular to the optical axis is represented by h, the shape of the aspherical surface is expressed by the following "Expression 1". In addition, infinity is expressed as "INF", and an aperture stop is expressed as "ST".

$$X = \frac{h^2/R}{1 + \sqrt{1 - (1+K)h^2/R^2}} + \sum_{i=0} A_i h^i \quad [\text{Expression 1}]$$

where
$A_i$: i-th order aspherical coefficient,
R: radius of curvature, and
K: conic constant.

Example 1

Basic features of an imaging optical system or a lens unit of Example 1 are as follows. Here, f denotes a focal length of the entire imaging optical system, F denotes an F number, and 2Y denotes a diagonal length of the imaging surface of the imaging device.
f=4.00 mm
F=2.3
2Y=2.70 mm
Data of the lens surface and the like of the imaging optical system or the lens unit of Example 1 are illustrated in Table 1 below.

TABLE 1

| Surf-N | R (mm) | D (mm) | Ns | ER (mm) |
| --- | --- | --- | --- | --- |
| 1(ST) | INF | −0.25 |  | 0.90 |
| 2* | 1.433 | 0.88 | 1.5374 | 0.91 |
| 3* | 6.035 | 0.90 |  | 0.85 |
| 4* | −3.386 | 0.60 | 1.6160 | 0.80 |
| 5* | −4.036 | 0.67 |  | 0.92 |
| 6* | 5.877 | 0.45 | 1.6160 | 0.99 |
| 7* | 1.843 | 0.30 |  | 1.21 |
| 8 | INF | 0.45 | 1.5098 | 1.27 |
| 9 | INF |  |  | 1.33 |

Aspherical coefficients of aspherical surfaces included in the imaging optical system or the lens unit of Example 1 are illustrated in Table 2 below. Note that, in the following description (including the lens data in the table), the power of 10 (for example, 2.5×10-02) is expressed using E (for example, 2.5E-02).

TABLE 2

Second surface

K = −0.10589E+00, A4 = −0.15751E−03, A6 = −0.49012E−02,
A8 = 0.79154E−02, A10 = −0.60362E−02
Third surface K = 0.85780E+01, A4 = 0.26577E−02, A6 = −0.32336E−02,
A8 = −0.35857E−02, A10 = −0.86912E−02
Fourth surface K = 0.12274E+02, A4 = −0.75759E−01, A6 = −0.13796E−01,
A8 = 0.50942E−01, A10 = −0.15285E+00, A12 = 0.13526E+00
Fifth surface K = −0.24628E+02, A4 = −0.13158E+00, A6 = 0.99810E−01,
A8 = −0.77630E−01, A10 = 0.42610E−01
Sixth surface K = −0.88231E+00, A4 = −0.35409E+00, A6 = 0.12438E+00,
A8 = −0.24967E−01, A10 = −0.24671E−01, A12 = 0.18759E−02

TABLE 2-continued

Seventh surface

K = −0.64941E+01, A4 = −0.23189E+00, A6 = 0.11747E+00,
A8 = −0.60444E−01, A10 = 0.52629E−02, A12 = 0.57128E−02,
A14 = −0.17454E−02

Single lens data of Example 1 is illustrated in Table 3 below.

TABLE 3

| Lens | Starting surface | Focal length (mm) |
|---|---|---|
| 1 | 2 | 3.279 |
| 2 | 4 | −52.711 |
| 3 | 6 | −4.554 |

Figure 3:
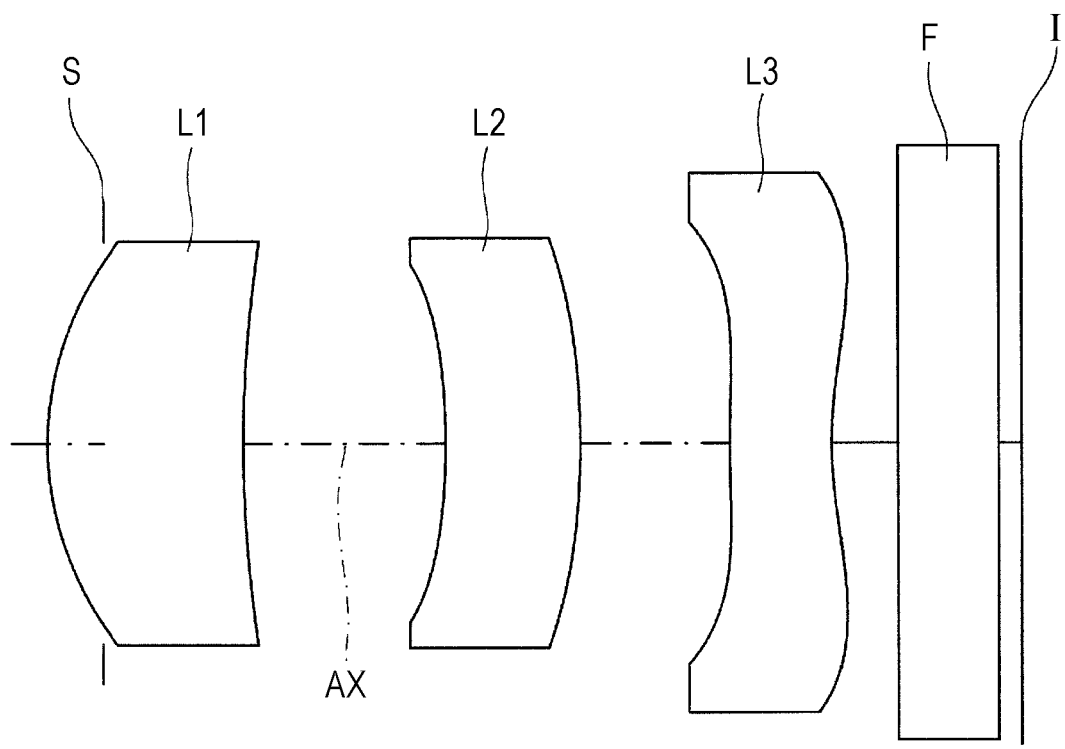
FIG. 3 is a cross-sectional view of an imaging optical system of Example 1 in accordance with one or more embodiments.

FIG. 3 is a cross-sectional view of an imaging optical system 11 or a camera module or the like for iris authentication of Example 1. The imaging optical system 11 includes a first lens L1 that is convex on the object side in the paraxial portion and is a positive meniscus, a second lens L2 having a refractive power of substantially zero in the paraxial portion, and a third lens L3 that is convex on the object side in the paraxial portion and is a negative meniscus. In the first to third lenses L1 to L3, both optical surfaces are aspherical. The first to third lenses L1 to L3 are all plastic lenses. An aperture stop S is arranged on the object side of the first lens L1. Further, a parallel flat plate F is arranged on the image side of the third lens L3. Note that, an imaging surface I corresponding to the photoelectric conversion unit 51a of the solid-state imaging device 51 is arranged to face the exit surface of the third lens L3 via the parallel flat plate F. It is a premise that the imaging optical system 11 uses the s-ray (wavelength 852.11 nm).

Figure 4A:
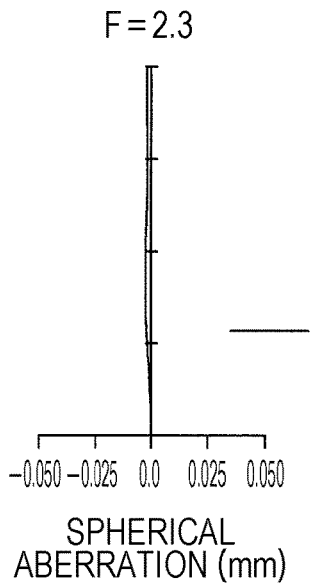
FIGS. 4A to 4E are aberration diagrams of Example 1.
Figure 4B:
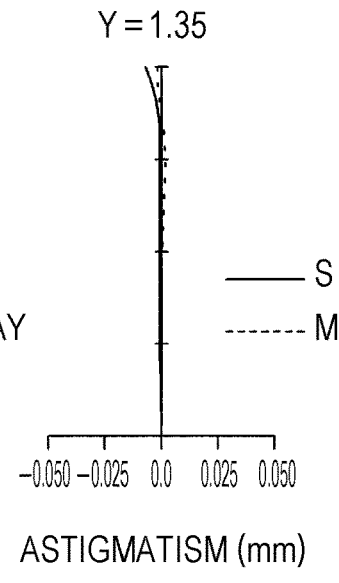
Figure 4C:
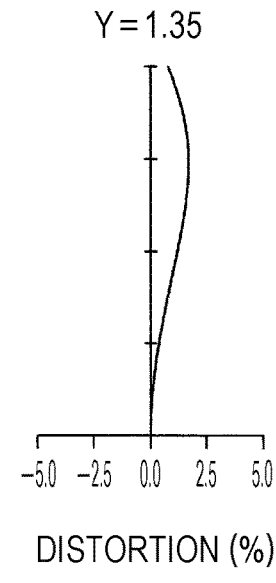
Figure 4D:
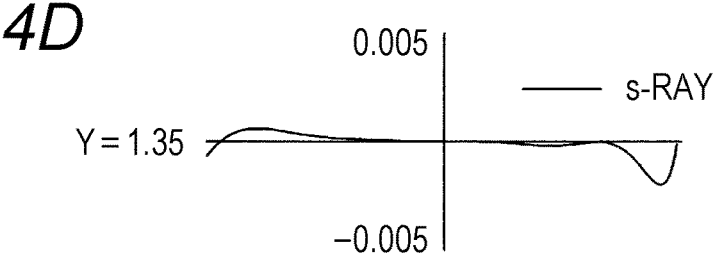
Figure 4E:
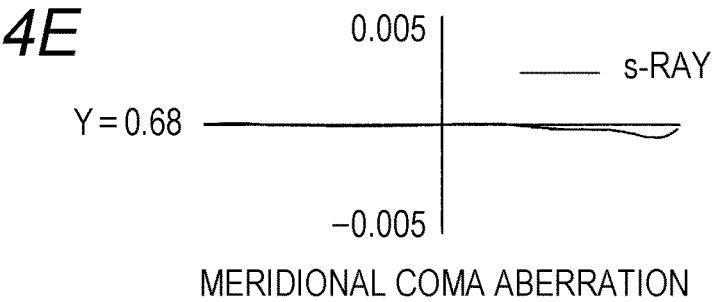

FIGS. 4A to 4C illustrate longitudinal aberration diagrams (spherical aberration, astigmatism, and distortion) of the imaging optical system 11 of Example 1, and FIGS. 4D and 4E illustrate lateral aberration diagrams of the imaging optical system 11 of Example 1.

Example 2

Basic features of an imaging optical system or a lens unit of Example 2 are as follows.
f=5.00 mm
F=2.1
2Y=3.60 mm Data of the lens surface and the like of the imaging optical system or the lens unit of Example 2 are illustrated in Table 4 below.

TABLE 4

| Surf-N | R (mm) | D (mm) | Ns | ER (mm) |
|---|---|---|---|---|
| 1(ST) | INF | −0.35 | | 1.21 |
| 2* | 1.885 | 0.65 | 1.5374 | 1.22 |
| 3* | 8.555 | 2.17 | | 1.20 |
| 4* | 5.612 | 0.24 | 1.5374 | 1.11 |
| 5* | 4.182 | 0.78 | | 1.24 |
| 6* | −12.952 | 0.32 | 1.5374 | 1.41 |
| 7* | 4.180 | 0.15 | | 1.62 |
| 8 | INF | 0.60 | 1.5098 | 1.70 |
| 9 | INF | | | 1.78 |

Aspherical coefficients of aspherical surfaces included in the imaging optical system or the lens unit of Example 2 are illustrated in Table 5 below.

TABLE 5

Second surface

K = −0.58238E+00, A4 = 0.71587E−02, A6 = −0.34319E−03,
A8 = 0.20615E−02, A10 = −0.84561E−03
Third surface K = 0.26126E+02, A4 = −0.24748E−02, A6 = −0.65712E−03,
A8 = −0.15531E−03, A10 = −0.65127E−03
Fourth surface K = 0.20763E+02, A4 = −0.17795E+00, A6 = −0.10361E+00,
A8 = 0.19555E−01, A10 = −0.16158E−01, A12 = 0.74402E−02
Fifth surface K = −0.73109E+01, A4 = −0.11336E+00, A6 = −0.89317E−01,
A8 = 0.45742E−01, A10 = 0.11394E−02
Sixth surface K = −0.12991E+02, A4 = −0.12834E+00, A6 = 0.43272E−01,
A8 = −0.42223E−01, A10 = 0.35021E−01, A12 = −0.91855E−02
Seventh surface K = 0.33322E+01, A4 = −0.13115E+00, A6 = 0.18298E−01,
A8 = −0.15549E−03, A10 = −0.93599E−03, A12 = 0.76266E−03,
A14 = −0.27825E−03

Single lens data of Example 2 is illustrated in Table 6 below.

TABLE 6

| Lens | Starting surface | Focal length (mm) |
|---|---|---|
| 1 | 2 | 4.351 |
| 2 | 4 | −32.458 |
| 3 | 6 | −5.843 |

Figure 5:
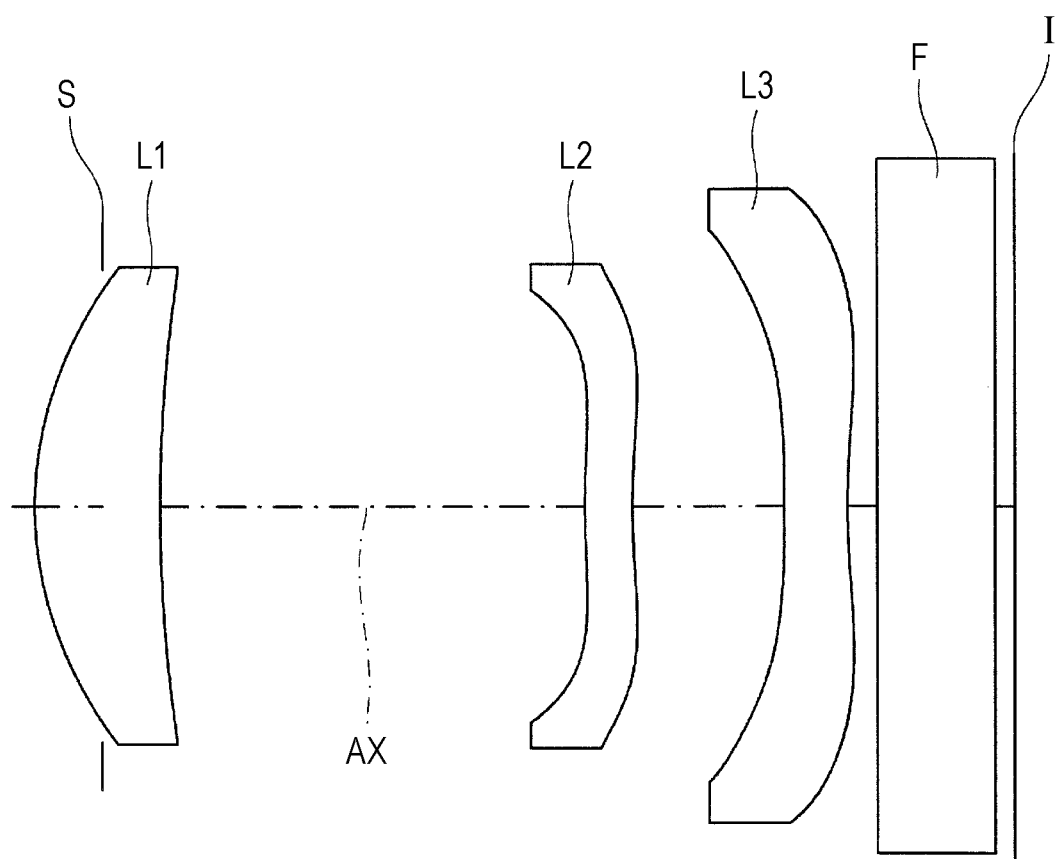
FIG. 5 is a cross-sectional view of an imaging optical system of Example 2 in accordance with one or more embodiments.

FIG. 5 is a cross-sectional view of an imaging optical system 12 and the like for iris authentication of Example 2. The imaging optical system 12 includes a first lens L1 that is convex on the object side in the paraxial portion and is a positive meniscus, a second lens L2 having a refractive power of substantially zero in the paraxial portion, and a third lens L3 that is biconcave in the paraxial portion and is negative. In the first to third lenses L1 to L3, both optical surfaces are aspherical. The first to third lenses L1 to L3 are all plastic lenses. An aperture stop S is arranged on the object side of the first lens L1. Further, a parallel flat plate F is arranged on the image side of the third lens L3. Note that, an imaging surface I corresponding to the photoelectric conversion unit 51a of the solid-state imaging device 51 is arranged to face the exit surface of the third lens L3 via the parallel flat plate F. It is a premise that the imaging optical system 12 uses the s-ray (wavelength 852.11 nm).

Figure 6A:
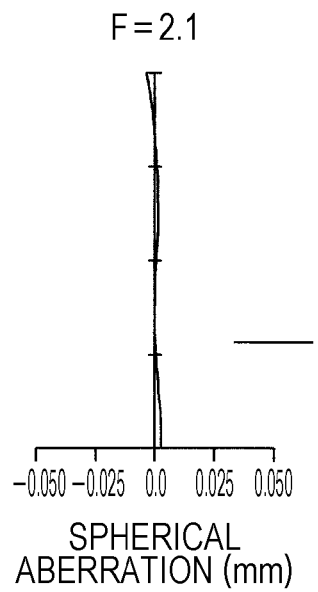
FIGS. 6A to 6E are aberration diagrams of Example 2.
Figure 6B:
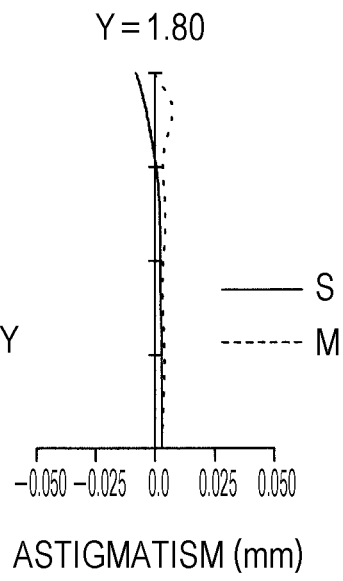
Figure 6C:
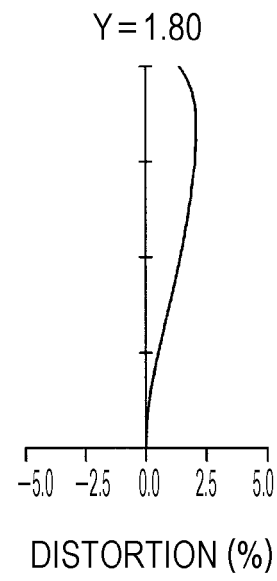
Figure 6D:
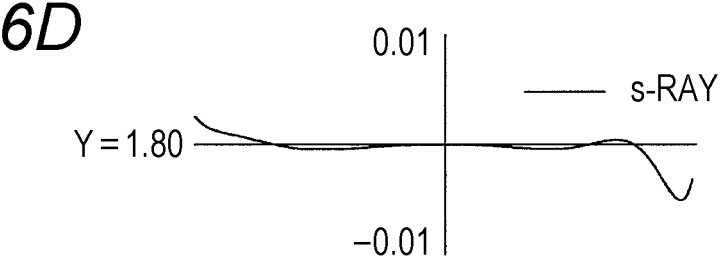
Figure 6E:
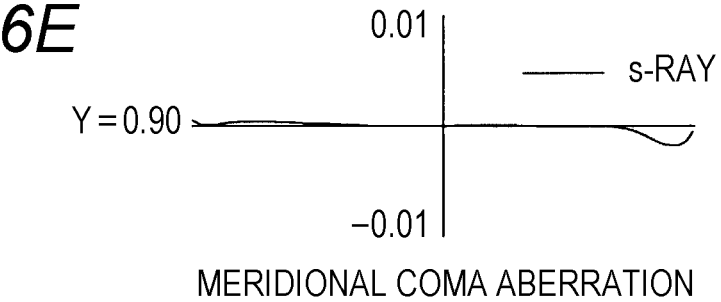

FIGS. 6A to 6C illustrate longitudinal aberration diagrams (spherical aberration, astigmatism, and distortion) of the imaging optical system 12 of Example 2, and FIGS. 6D and 6E illustrate lateral aberration diagrams of the imaging optical system 12 of Example 2.

Example 3

Basic features of an imaging optical system or a lens unit of Example 3 are as follows.
f=4.80 mm
F=2.2
2Y=3.20 mm Data of the lens surface and the like of the imaging optical system or the lens unit of Example 3 are illustrated in Table 7 below.

TABLE 7

| Surf-N | R (mm) | D (mm) | Ns | ER (mm) |
|---|---|---|---|---|
| 1* | 1.777 | 1.00 | 1.5374 | 1.18 |
| 2* | 8.274 | 0.35 | | 0.96 |
| 3(ST) | INF | 1.01 | | 0.84 |
| 4* | INF | 0.62 | 1.5374 | 0.91 |
| 5* | INF | 0.29 | | 1.02 |
| 6* | −15.278 | 0.83 | 1.6160 | 0.99 |
| 7* | 3.457 | 0.26 | | 1.33 |
| 8 | INF | 0.60 | 1.5098 | 1.42 |
| 9 | INF | | | 1.54 |

Aspherical coefficients of aspherical surfaces included in the imaging optical system or the lens unit of Example 3 are illustrated in Table 8 below.

TABLE 8

First surface

K = −0.54909E+00, A4 = 0.76479E−02, A6 = −0.93508E−04,
A8 = 0.16057E−02, A10 = −0.65847E−03
Second surface K = 0.37166E+02, A4 = −0.55676E−02, A6 = −0.31076E−02,
A8 = −0.19567E−02, A10 = −0.99367E−03
Fourth surface K = 0.00000E+00, A4 = −0.80339E−01, A6 = −0.96357E−02,
A8 = −0.54949E−01, A10 = 0.37193E−01, A12 = −0.36720E−01
Fifth surface K = 0.00000E+00, A4 = −0.17381E+00, A6 = 0.55744E−01,
A8 = −0.95010E−01, A10 = 0.30495E−01
Sixth surface K = −0.50000E+02, A4 = −0.26438E+00, A6 = 0.30690E−01,
A8 = 0.98208E−02, A10 = −0.83035E−01, A12 = 0.47423E−01
Seventh surface K = 0.34381E+01, A4 = −0.15880E+00, A6 = 0.57019E−01,
A8 = −0.24556E−01, A10 = 0.52680E−02, A12 = −0.14046E−03,
A14 = −0.17275E−03

Single lens data of Example 3 is illustrated in Table 9 below.

TABLE 9

| Lens | Starting surface | Focal length (mm) |
|---|---|---|
| 1 | 1 | 3.995 |
| 2 | 4 | INF |
| 3 | 6 | −4.501 |

Figure 7:
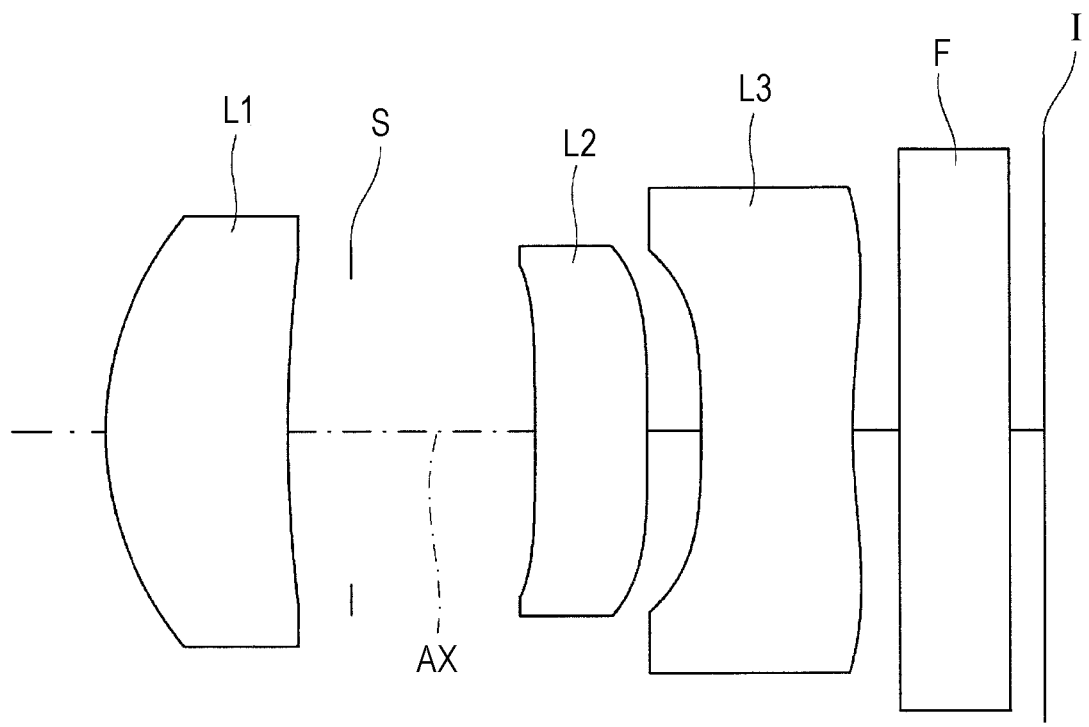
FIG. 7 is a cross-sectional view of an imaging optical system of Example 3 in accordance with one or more embodiments.

FIG. 7 is a cross-sectional view of an imaging optical system 13 for iris authentication of Example 3. The imaging optical system 13 has a first lens L1 that is convex on the object side in the paraxial portion and is a positive meniscus, a second lens L2 having a refractive power of zero in the paraxial portion, and a third lens L3 that is biconcave in the paraxial portion and is negative. In the first to third lenses L1 to L3, both optical surfaces are aspherical. The first to third lenses L1 to L3 are all plastic lenses. An aperture stop S is arranged between the first lens L1 and the second lens L2. Further, a parallel flat plate F is arranged on the image side of the third lens L3. Note that, an imaging surface I corresponding to the photoelectric conversion unit 51a of the solid-state imaging device 51 is arranged to face the exit surface of the third lens L3 via the parallel flat plate F. It is a premise that the imaging optical system 13 uses the s-ray (wavelength 852.11 nm).

Figure 8A:
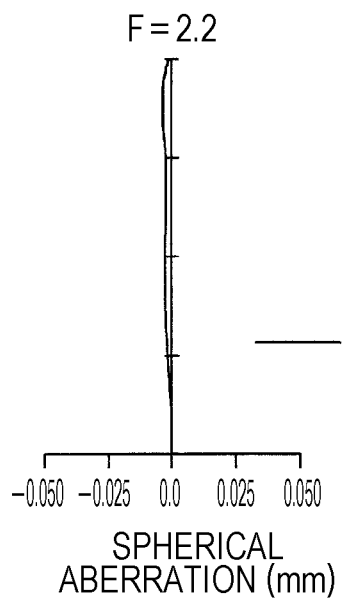
FIGS. 8A to 8E are aberration diagrams of Example 3.
Figure 8B:
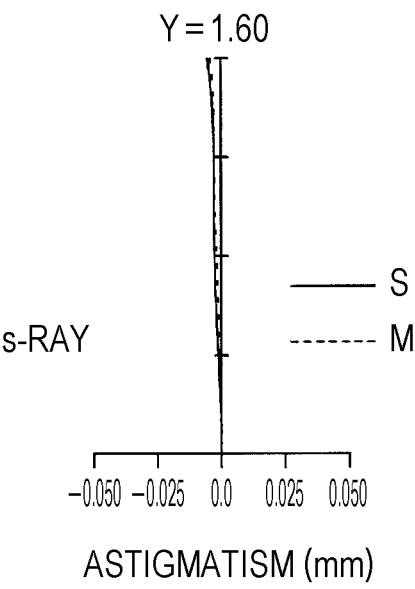
Figure 8C:
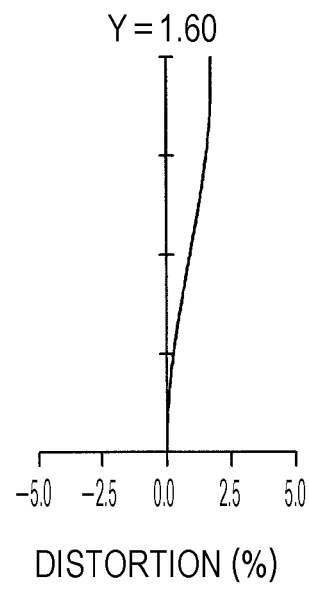
Figure 8D:
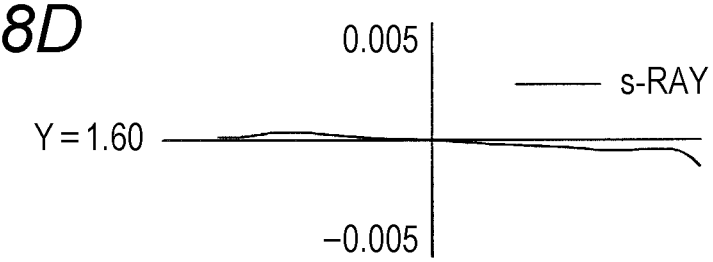
Figure 8E:
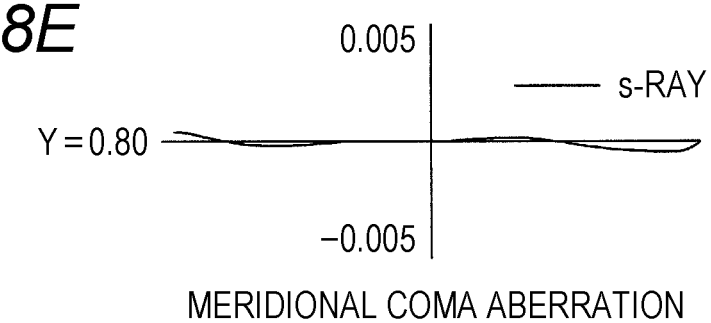

FIGS. 8A to 8C illustrate longitudinal aberration diagrams (spherical aberration, astigmatism, and distortion) of the imaging optical system 13 of Example 3, and FIGS. 8D and 8E illustrate lateral aberration diagrams of the imaging optical system 13 of Example 3.

Example 4

Basic features of an imaging optical system or a lens unit of Example 4 are as follows.
f=4.00 mm
F=2.3
2Y=2.70 mm
Data of the lens surface and the like of the imaging optical system or the lens unit of Example 4 are illustrated in Table 10 below.

TABLE 10

| Surf-N | R (mm) | D (mm) | Ns | ER (mm) |
|---|---|---|---|---|
| 1(ST) | INF | −0.25 | | 0.90 |
| 2* | 1.683 | 0.64 | 1.5374 | 0.90 |
| 3* | 10.944 | 1.92 | | 0.87 |
| 4* | −7.145 | 0.67 | 1.6160 | 0.91 |
| 5* | −5.843 | 0.32 | | 1.11 |
| 6* | 59.799 | 0.40 | 1.6160 | 1.16 |
| 7* | 2.075 | 0.16 | | 1.37 |
| 8 | INF | 0.10 | 1.5098 | 1.36 |
| 9 | INF | | | 1.36 |

Aspherical coefficients of aspherical surfaces included in the imaging optical system or the lens unit of Example 4 are illustrated in Table 11 below.

TABLE 11

Second surface

K = −0.12902E+00, A4 = −0.15985E−02, A6 = −0.14720E−02,
A8 = 0.17904E−02, A10 = −0.32346E−03
Third surface K = 0.13611E+01, A4 = 0.59369E−02, A6 = 0.46508E−02,
A8 = −0.59765E−02, A10 = 0.40717E−02
Fourth surface K = 0.50000E+02, A4 = −0.15124E+00, A6 = −0.68429E−01,
A8 = −0.23026E−02, A10 = −0.11215E+00, A12 = 0.11924E+00
Fifth surface K = −0.48037E+02, A4 = −0.27310E+00, A6 = 0.75548E−01,
A8 = −0.29968E−01, A10 = 0.23299E−01
Sixth surface K = −0.50000E+02, A4 = −0.50357E+00, A6 = 0.32331E+00,
A8 = −0.50259E−01, A10 = 0.41836E−02, A12 = −0.11958E−01
Seventh surface K = −0.12985E+02, A4 = −0.24008E+00, A6 = 0.19620E+00,
A8 = −0.89234E−01, A10 = 0.14896E−01, A12 = −0.39140E−02,
A14 = 0.98668E−03

Single lens data of Example 4 is illustrated in Table 12 below.

TABLE 12

| Lens | Starting surface | Focal length (mm) |
|---|---|---|
| 1 | 2 | 3.614 |
| 2 | 4 | 43.478 |
| 3 | 6 | −3.499 |

Figure 9:
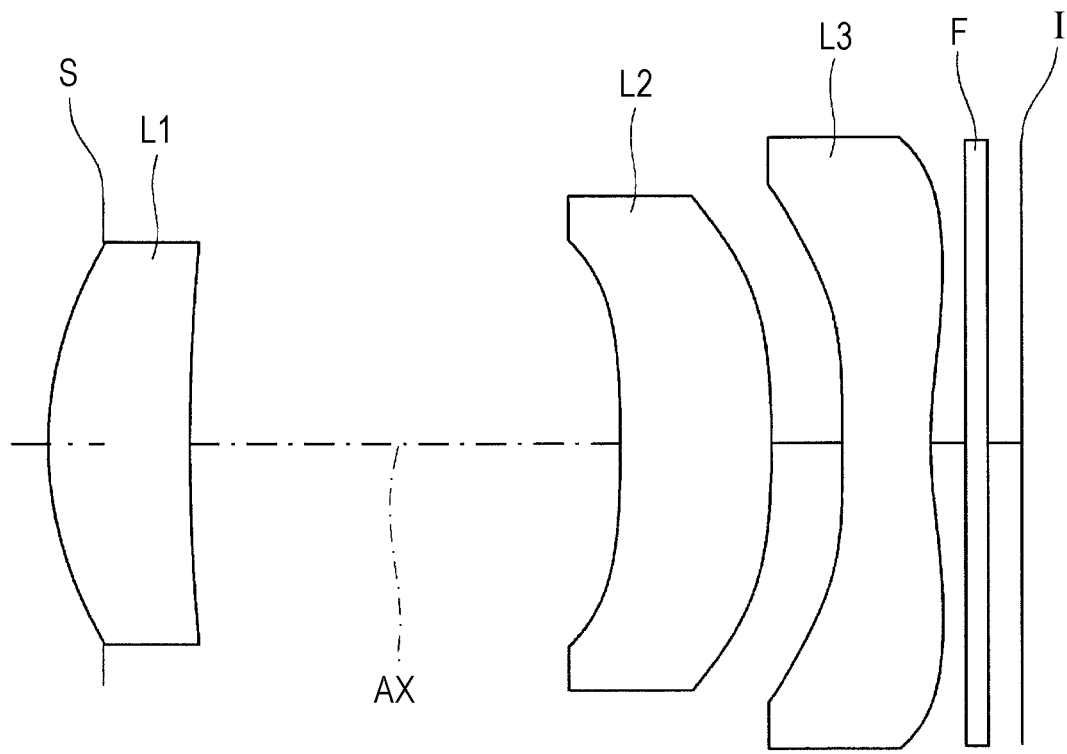
FIG. 9 is a cross-sectional view of an imaging optical system of Example 4 in accordance with one or more embodiments.

FIG. 9 is a cross-sectional view of an imaging optical system 14 and the like for iris authentication of Example 4. The imaging optical system 14 includes a first lens L1 that is convex on the object side in the paraxial portion and is a positive meniscus, a second lens L2 having a refractive power of substantially zero in the paraxial portion, and a third lens L3 that is convex on the object side in the paraxial portion and is a negative meniscus. In the first to third lenses L1 to L3, both optical surfaces are aspherical. The first to third lenses L1 to L3 are all plastic lenses. An aperture stop S is arranged on the object side of the first lens L1. Further, a parallel flat plate F is arranged on the image side of the third lens L3. Note that, an imaging surface I corresponding to the photoelectric conversion unit 51a of the solid-state imaging device 51 is arranged to face the exit surface of the third lens L3 via the parallel flat plate F. It is a premise that the imaging optical system 14 uses the s-ray (wavelength 852.11 nm).

Figure 10A:
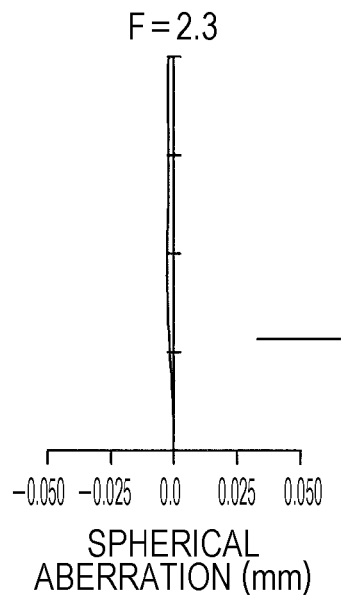
FIGS. 10A to 10E are aberration diagrams of Example 4.
Figure 10B:
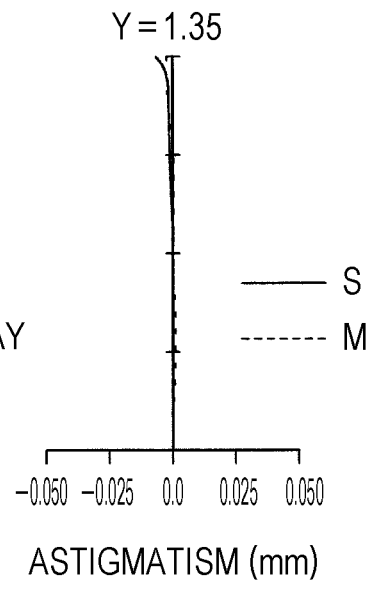
Figure 10C:
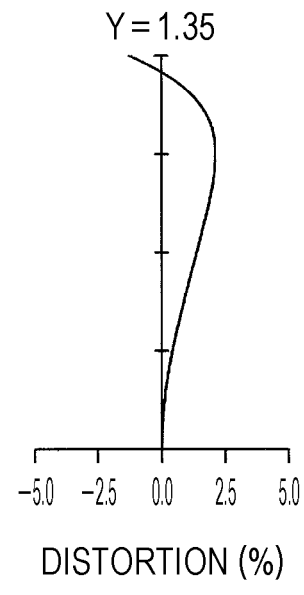
Figure 10D:
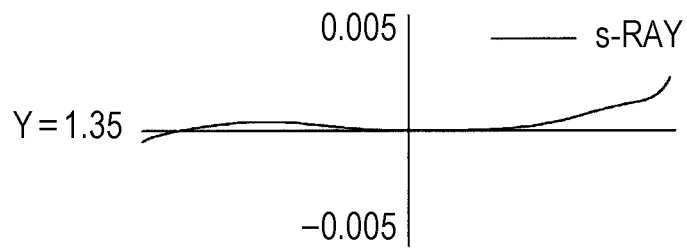
Figure 10E:
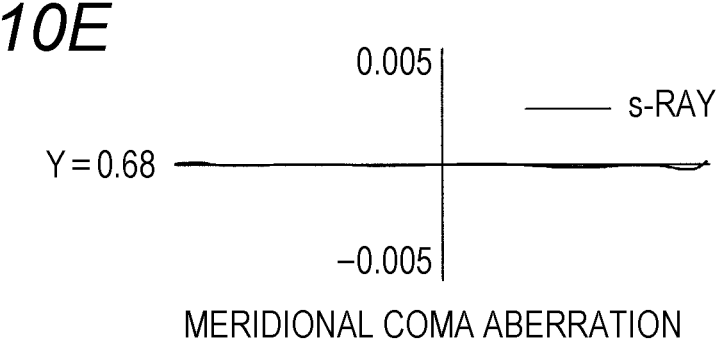

FIGS. 10A to 10C illustrate longitudinal aberration diagrams (spherical aberration, astigmatism, and distortion) of the imaging optical system 14 of Example 4, and FIGS. 10D and 10E illustrate lateral aberration diagrams of the imaging optical system 14 of Example 4.

Example 5

Basic features of an imaging optical system or a lens unit of Example 5 are as follows.
f=5.50 mm
F=2.3
2Y=3.60 mm
Data of the lens surface and the like of the imaging optical system or the lens unit of Example 5 are illustrated in Table 13 below.

TABLE 13

| Surf-N | R (mm) | D (mm) | Ns | ER (mm) |
|---|---|---|---|---|
| 1(ST) | INF | −0.35 | | 1.21 |
| 2* | 1.924 | 0.62 | 1.5374 | 1.22 |
| 3* | 7.157 | 2.20 | | 1.19 |
| 4* | INF | 0.28 | 1.5374 | 1.12 |
| 5* | INF | 0.83 | | 1.23 |
| 6* | −7.189 | 0.46 | 1.5374 | 1.33 |
| 7* | 5.066 | 0.29 | | 1.62 |
| 8 | INF | 0.60 | 1.5098 | 1.71 |
| 9 | INF | | | 1.77 |

Aspherical coefficients of aspherical surfaces included in the imaging optical system or the lens unit of Example 5 are illustrated in Table 14 below.

TABLE 14

Second surface

K = −0.56411E+00, A4 = 0.76467E−02, A6 = −0.32184E−03,
A8 = 0.19056E−02, A10 = −0.58480E−03

Third surface

K = 0.19413E+02, A4 = −0.31786E−02, A6 = −0.14799E−02,
A8 = 0.45921E−03, A10 = −0.79168E−03

Fourth surface

K = 0.00000E+00, A4 = −0.13493E+00, A6 = −0.81841E−01,
A8 = 0.27519E−01, A10 = −0.10199E−01, A12 = 0.43475E−02

Fifth surface

K = 0.00000E+00, A4 = −0.11086E+00, A6 = −0.67873E−01,
A8 = 0.43677E−01, A10 = −0.49541E−02

TABLE 14-continued

Sixth surface

K = 0.82036E+01, A4 = −0.10814E+00, A6 = 0.18448E−01,
A8 = −0.34288E−01, A10 = 0.38504E−01, A12 = −0.12713E−01

Seventh surface

K = 0.75685E+01, A4 = −0.10190E+00, A6 = 0.40015E−02,
A8 = 0.25652E−02, A10 = −0.15129E−02, A12 = 0.48033E−03,
A14 = −0.18442E−03

Single lens data of Example 5 is illustrated in Table 15 below.

TABLE 15

| Lens | Starting surface | Focal length (mm) |
|---|---|---|
| 1 | 2 | 4.701 |
| 2 | 4 | INF |
| 3 | 6 | −5.459 |

Figure 11:
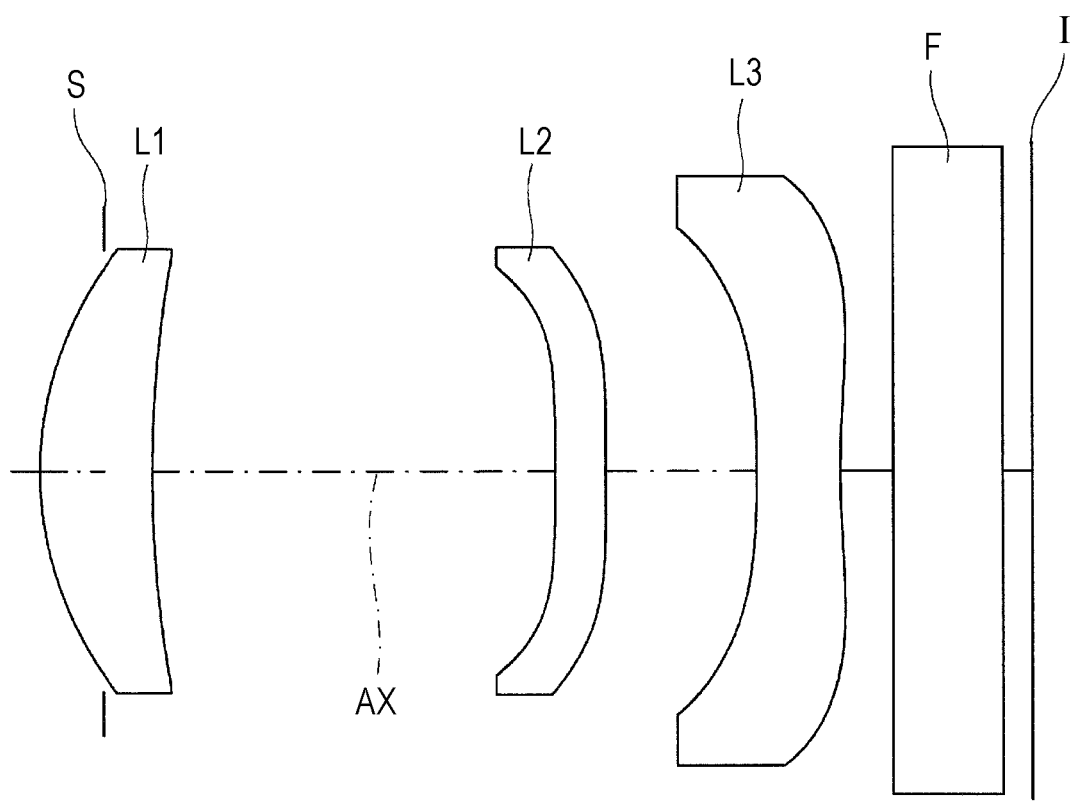
FIG. 11 is a cross-sectional view of an imaging optical system of Example 5 in accordance with one or more embodiments.

FIG. 11 is a cross-sectional view of an imaging optical system 15 and the like for iris authentication of Example 5. The imaging optical system 15 includes a first lens L1 that is convex on the object side in the paraxial portion and is a positive meniscus, a second lens L2 having a refractive power of zero in the paraxial portion, and a third lens L3 that is biconcave in the paraxial portion and is negative. In the first to third lenses L1 to L3, both optical surfaces are aspherical. The first to third lenses L1 to L3 are all plastic lenses. An aperture stop S is arranged on the object side of the first lens L1. Further, a parallel flat plate F is arranged on the image side of the third lens L3. Note that, an imaging surface I corresponding to the photoelectric conversion unit 51a of the solid-state imaging device 51 is arranged to face the exit surface of the third lens L3 via the parallel flat plate F. It is a premise that the imaging optical system 15 uses the s-ray (wavelength 852.11 nm).

Figure 12A:
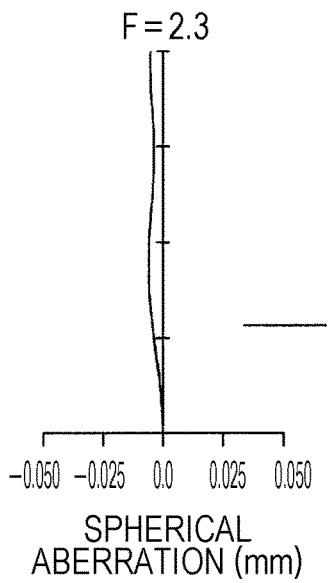
FIGS. 12A to 12E are aberration diagrams of Example 5.
Figure 12B:
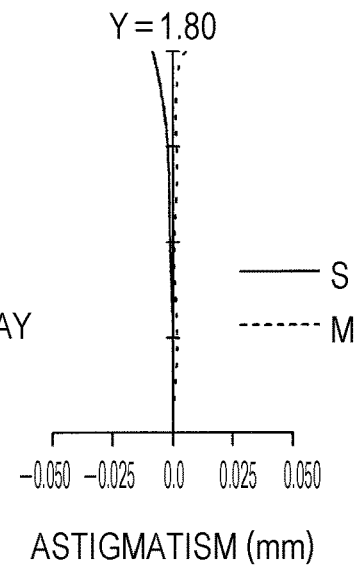
Figure 12C:
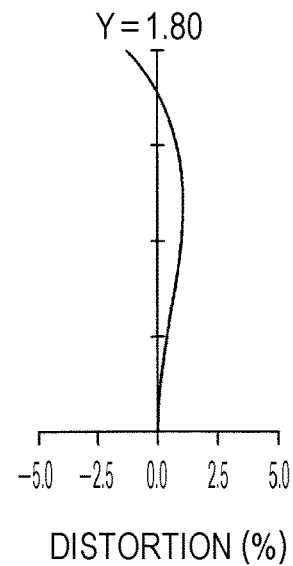
Figure 12D:
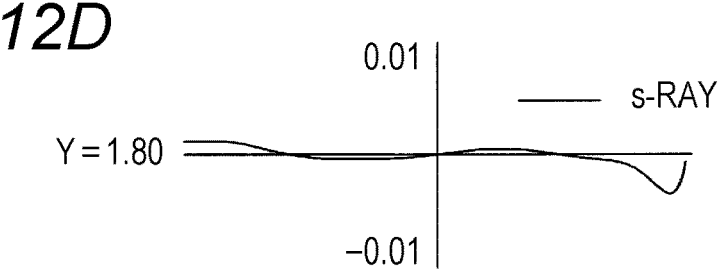
Figure 12E:
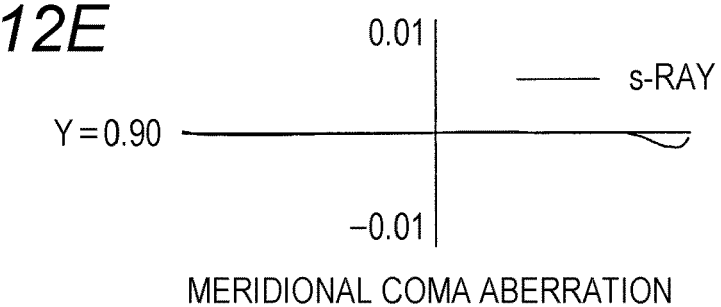

FIGS. 12A to 12C illustrate longitudinal aberration diagrams (spherical aberration, astigmatism, and distortion) of the imaging optical system 15 of Example 5, and FIGS. 12D and 12E illustrate lateral aberration diagrams of the imaging optical system 15 of Example 5.

Example 6

Basic features of an imaging optical system or a lens unit of Example 6 are as follows.
f=4.84 mm
F=2.2
2Y=3.20 mm
Data of the lens surface and the like of the imaging optical system or the lens unit of Example 6 are illustrated in Table 16 below.

TABLE 16

| Surf-N | R (mm) | D (mm) | Ns | ER (mm) |
|---|---|---|---|---|
| 1* | 1.743 | 1.00 | 1.5468 | 1.32 |
| 2* | 6.797 | 0.34 | | 1.05 |
| 3(ST) | INF | 1.07 | | 0.84 |
| 4* | 94.017 | 0.62 | 1.5374 | 0.90 |
| 5* | 317.843 | 0.29 | | 1.02 |
| 6* | −9.031 | 0.83 | 1.6160 | 0.99 |
| 7* | 4.043 | 0.20 | | 1.33 |
| 8 | INF | 0.60 | 1.5098 | 1.40 |
| 9 | INF | | | 1.52 |

Aspherical coefficients of aspherical surfaces included in the imaging optical system or the lens unit of Example 6 are illustrated in Table 17 below.

TABLE 17

First surface

K = −0.64366E−01, A4 = −0.22702E−02, A6 = −0.18226E−02,
A8 = 0.10595E−02, A10 = −0.57239E−03
Second surface TABLE 17-continued K = 0.11071E+02, A4 = 0.67171E−03, A6 = 0.70747E−03,
A8 = −0.22554E−02, A10 = 0.49890E−03
Fourth surface K = −0.50000E+02, A4 = −0.88276E−01, A6 = −0.17832E−01,
A8 = −0.56050E−01, A10 = 0.40888E−01, A12 = −0.47452E−01
Fifth surface K = 0.50000E+02, A4 = −0.17726E+00, A6 = 0.28529E−01,
A8 = −0.87880E−01, A10 = 0.35114E−01
Sixth surface K = −0.32147E+02, A4 = −0.26375E+00, A6 = 0.25791E−01,
A8 = −0.25440E−01, A10 = −0.45659E−01, A12 = 0.45023E−01
Seventh surface K = 0.61755E+01, A4 = −0.14939E+00, A6 = 0.45398E−01,
A8 = −0.14347E−01, A10 = −0.20197E−02, A12 = 0.33636E−02,
A14 = −0.98142E−03

Single lens data of Example 6 is illustrated in Table 18 below.

TABLE 18

| Lens | Starting surface | Focal length (mm) |
|---|---|---|
| 1 | 1 | 4.008 |
| 2 | 4 | 248.219 |
| 3 | 6 | −4.427 |

Figure 13:
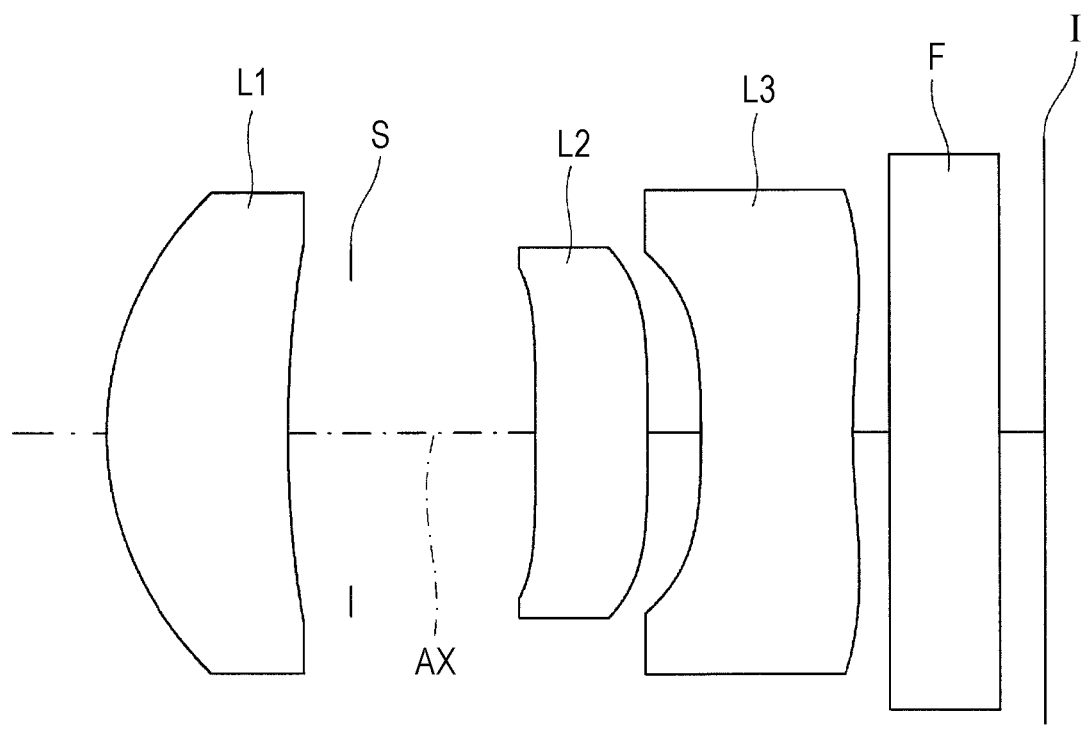
FIG. 13 is a cross-sectional view of an imaging optical system of Example 6 in accordance with one or more embodiments.

FIG. 13 is a cross-sectional view of an imaging optical system 16 and the like for iris authentication of Example 6. The imaging optical system 16 includes a first lens L1 that is convex on the object side in the paraxial portion and is a positive meniscus, a second lens L2 having a refractive power of substantially zero in the paraxial portion, and a third lens L3 that is biconcave in the paraxial portion and is negative. In the first to third lenses L1 to L3, both optical surfaces are aspherical. The first lens L1 is a glass lens, and the second and third lenses L2 and L3 are plastic lenses. An aperture stop S is arranged between the first lens L1 and the second lens L2. Further, a parallel flat plate F is arranged on the image side of the third lens L3. Note that, an imaging surface I corresponding to the photoelectric conversion unit 51a of the solid-state imaging device 51 is arranged to face the exit surface of the third lens L3 via the parallel flat plate F. It is a premise that the imaging optical system 16 uses the s-ray (wavelength 852.11 nm).

Figure 14A:
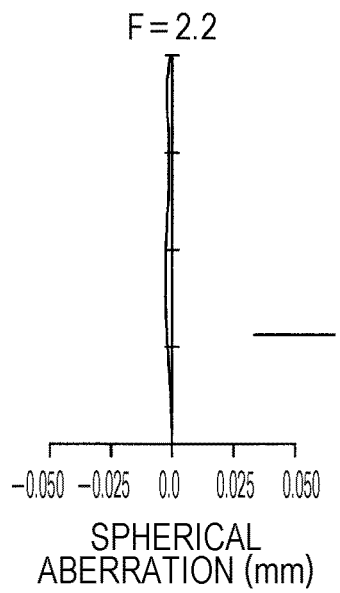
FIGS. 14A to 14E are aberration diagrams of Example 6.
Figure 14B:
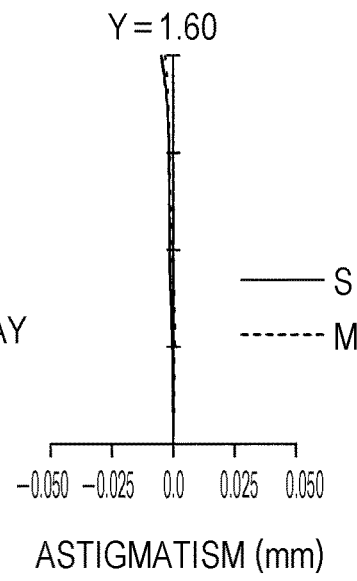
Figure 14C:
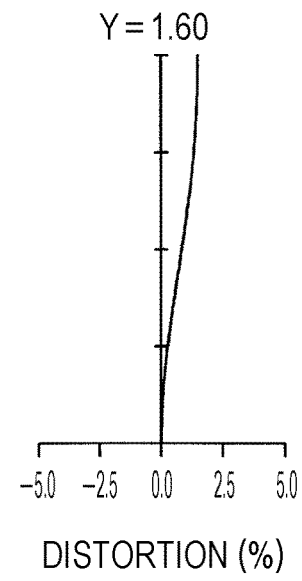
Figure 14D:
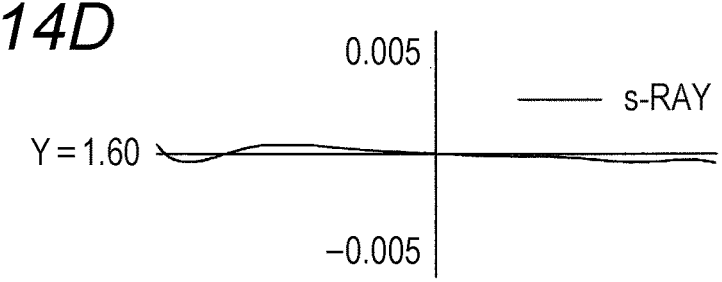
Figure 14E:
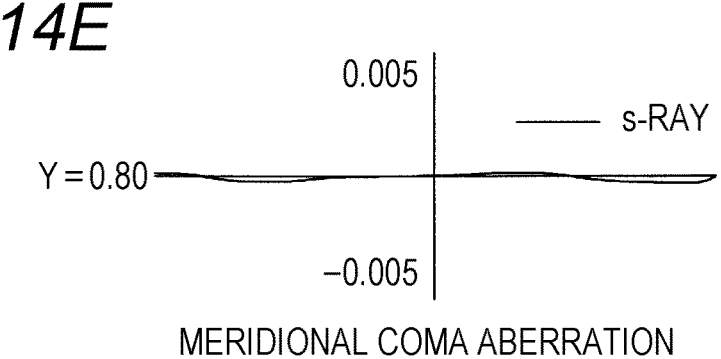

FIGS. 14A to 14C illustrate longitudinal aberration diagrams (spherical aberration, astigmatism, and distortion) of the imaging optical system 16 of Example 6, and FIGS. 14D and 14E illustrate lateral aberration diagrams of the imaging optical system 16 of Example 6.

The following Table 19 summarizes the values of Examples 1 to 6 corresponding to the conditional expressions (1) to (6) for reference.

TABLE 19

| Conditional Expression | | Example 1 | Example 2 | Example 3 | Example 4 | Example 5 | Example 6 |
|---|---|---|---|---|---|---|---|
| (1) | f/TL | 0.95 | 1.04 | 0.97 | 0.93 | 1.05 | 0.98 |
| (2) | f/f2 | −0.08 | −0.15 | 0.00 | 0.09 | 0.00 | 0.02 |
| (3) | d2/f | 0.23 | 0.43 | 0.28 | 0.48 | 0.40 | 0.28 |
| (4) | f1/f | 0.82 | 0.87 | 0.83 | 0.90 | 0.86 | 0.83 |
| (5) | f3/f | −1.14 | −1.17 | −0.94 | −0.87 | −0.99 | −0.91 |
| (6) | 2w | 36.2 | 38.6 | 35.8 | 36.8 | 36.2 | 35.6 |

The present invention has been described with reference to the above examples; however, the present invention is not limited to the above embodiments and the like. For example, in one or more embodiments, the imaging optical system is used for iris authentication; however, the imaging optical system is applicable not only to this application but also to various non-wide angle imaging systems.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A mobile device comprising:
 an imaging apparatus that comprises:
  a lens unit;
  an image detector that detects an image formed by the lens unit; and
  a processor that processes a signal from the image detector, and
 wherein the lens unit comprises:
  an imaging optical system; and
  a lens barrel holding the imaging optical system,
  wherein the imaging optical system comprises, in order from an object side:
   a first lens having positive refractive power;
   a second lens having an aspherical surface; and
   a third lens having:
    negative refractive power;
    an aspherical surface; and
    an inflection point other than an intersection with an optical axis,
  wherein the imaging optical system satisfies conditional expressions (1) to (3):

$f/TL > 0.92$ (1)

$0.10 > f/f2 > -0.17$ (2)

$0.60 > d2/f \geq 0.40$ (3), where f is a focal length of an entirety of the imaging optical system, TL is a distance from a lens surface closest to the object side to an image side focal point on the optical axis, d2 is an axial air space between the first lens and the second lens, and f2 is a focal length of the second lens, and wherein conditional expression (5) is satisfied:

$$-0.8 > f3/f \geq -0.99 \tag{5}$$

where f3 is a focal length of the third lens, wherein the mobile device further causes the imaging apparatus to perform imaging, and comprises:

a display that comprises a pair of light sources, wherein each of the light sources emits near infrared illumination light having a wavelength of 750 nm to 900 nm toward an eye of a user, wherein the lens unit is used for iris authentication, and wherein the imaging optical system and the light sources are disposed at an upper portion of the display.

2. The mobile device according to claim 1, wherein conditional expression (4) is satisfied:

$$1.1 > f1/f > 0.7 \tag{4}$$

wherein f1 is a focal length of the first lens.

3. The mobile device according to claim 1, wherein conditional expression (6) is satisfied:

$$45° > 2w \tag{6}$$

wherein w is a half angle of view.

4. The mobile device according to claim 1, wherein the first lens is formed from a glass material.

5. The mobile device according to claim 1, wherein the first to third lenses are formed from a material having optical transparency in a near infrared wavelength range.

6. The mobile device according to claim 1, further comprising an optical device that is an additional lens or a filter and has no refractive power.

7. A lens unit comprising:

an imaging optical system; and a lens barrel holding the imaging optical system, wherein the imaging optical system comprises, in order from an object side:

a first lens having positive refractive power;

a second lens having an aspherical surface; and a third lens having:

negative refractive power;

an aspherical surface; and an inflection point other than an intersection with an optical axis, wherein the imaging optical system satisfies conditional expressions (1) to (3):

$$f/TL > 0.92 \tag{1}$$

$$0.10 > f/f2 > -0.17 \tag{2}$$

$$0.60 > d2/f \geq 0.40 \tag{3},$$

where f is a focal length of an entirety of the imaging optical system,

TL is a distance from a lens surface closest to the object side to an image side focal point on the optical axis, d2 is an axial air space between the first lens and the second lens, and f2 is a focal length of the second lens, wherein conditional expression (5) is satisfied:

$$-0.8 > f3/f \geq -0.99 \tag{5}$$

where f3 is a focal length of the third lens, and wherein the lens unit is used for iris authentication.

* * * * *